INVENTORS.
OLAF JOHN BARCLAY ORWIN
DAVID JOHN FORTUNE
BY Kurt Kelman
AGENT

Oct. 15, 1968   O. J. B. ORWIN ET AL   3,405,790
LOCKING DEVICE FOR AN OVERLOAD CLUTCH
Filed Jan. 5, 1967   5 Sheets-Sheet 3

INVENTORS.
OLAF JOHN BARCLAY ORWIN
DAVID JOHN FORTUNE
BY Kurt Kelman
AGENT

United States Patent Office 3,405,790
Patented Oct. 15, 1968

3,405,790
LOCKING DEVICE FOR AN OVERLOAD CLUTCH
Olaf J. B. Orwin, Quinton, Birmingham, Warwick, and David J. Fortune, Weston, Bath, Somerset, England, assignors to Fisholow Products Limited, Tipton, England, a British company
Filed Jan. 5, 1967, Ser. No. 607,519
Claims priority, application Great Britain, Jan. 11, 1966, 1,206/66
7 Claims. (Cl. 192—56)

ABSTRACT OF THE DISCLOSURE

Overload clutches comprising resiliently urged together torque transmitting driving and driven members, and a free-wheel locking device which after overload facilitates an easier clutch re-engagement.

BACKGROUND OF THE INVENTION

Field of the invention

This invention relates to overload clutches of the kind, herein called the kind specified, comprising resiliently urged together torque transmitting driving and driven clutch members, each having a plurality of mutually registrable ball engaging torque transmitting openings, a plurality of torque transmitting balls and a ball guiding member disposed between the two clutch members, said guiding member having a plurality of ball guiding slots, one portion of each of which slots is registrable with a pair of the mutually registrable torque transmitting openings, with one end of each slot being out of register with said openings, with the ball engaging sides of the slots intermediate the said in register portion and the said end portions extending in a direction which is so inclined to the circumferential direction, and to the designed direction of clutch rotation that when after overload re-engagement of the clutch is required, the slot sides can transmit a force to the balls to displace them along the slots to their in register portions, and the balls having a diameter greater than the axial thickness of the ball guiding member, so as to project on opposite sides thereof into the torque transmitting openings.

Description of the prior art

One form of overload clutch of the kind specified is already known, in which the ball buiding member is connected non-rotatably to one of the two clutch members, so as to rotate therewith. Such an arrangement possesses the important advantage that one portion of each slot is permanently in register with the torque transmitting openings of the one clutch member to which it is permanently connected. Accordingly when, after overload has occurred, it is desired to re-engage the clutch, this can be done very simply by rotating the two clutch members relatively in a direction the reverse of that which obtains during overload, so as to bring the torque transmitting openings of the two members into register with one another, and at the same time advance the balls along the slots to the portion thereof which is in register with the torque transmitting openings.

This previously known arrangement does however entail the disadvantage that when overload has occured and the balls have advanced along the slots to the one end thereof which is out of register with the torque transmitting openings, because the ball guiding member is connected non-rotatably to the one clutch member, the balls will be in relative sliding engagement as opposed to simple rolling engagement with at least one of the two clutch members. Usually the balls will be in hard non-relatively rotatable engagement with the one end of the slots in the ball guiding member and clutch member connected thereto, while being in relatively slidable engagement with the other clutch member, so long as the two clutch members are rotating relatively. The above effect arises from the fact that once the balls reach the one end of their respective slots they are no longer free to roll relative to the opposed faces of the two clutch members, and since these are being urged towards one another under the pressure of the spring or other loadings means, it follows that so long as the driving member of the clutch continues to be power rotated, rapid wear of the balls and the surfaces which are in relative slidable engagement therewith will occur, particularly if the torque loading is heavy, unless the power to the driving member is now quickly cut off after the clutch has disengaged, with the result that the useful life of the clutch will be limited.

With a view to overcoming the disadvantage of the prior arrangement aforementioned, there has been developed the alternative construction described in the specification of our patent application No. 436,603, in which the ball guiding element is mounted for rotational movement in relation to both the driving and the driven clutch members.

Such an arrangement possesses the important advantage that the balls are no longer in sliding engagement with either the driving or the driven clutch members, when with the clutch disengaged and the driving member still power driven, the balls are at the ends of the ball guiding slots, which are out of register with the torque transmitting openings. Under these conditions the balls have rolling engagement with the opposed faces of the driving and driven clutch members, and the guiding member will rotate at half the speed of the driving member under the reaction of the rolling balls on the adjacent ends of the slots. Thus the only relative sliding movement is between the balls and the said ends of the slots. However, as the balls are not being forced by the spring or other loading into hard pressure engagement with these ends of the slots in the ball guiding member, the wear of the balls which occurs under these conditions is insignificant even under very heavy torques.

Such alternative arrangement entails however, the disadvantage that as the ball guiding member is free to rotate in relation to both clutch members, when overload has occurred and the driving member has been brought to rest, the ball guiding member in all probability will then occupy a rotational position in which its slots are out of register with the torque transmitting openings of both clutch members. In consequence when it is desired to re-engage the clutch, it is necessary not only relatively to rotate the ball guiding member and one of the two clutch members, until one portion of the slots of the guiding member are in register with the torque transmitting openings of said clutch member, but also then positively to retain the ball guiding member in such in register position while rotating the two clutch members relatively in a direction as to cause the balls under the reaction thrust from the said inclined sides of the ball guiding slots to return therealong into a position in which they are in register with the two sets of torque transmitting openings when these have been brought into alignment with one another by the relative rotation of the two clutch members.

This requirement for retention of the ball guiding member positively in register with the one clutch member while the two clutch members are rotated in the relative direction above mentioned, necessitates the provision of some special tool to hold the ball guiding member in its in register position, which may be inconvenient, and generally in this last mentioned arrangement the operation of reengaging the clutch is somewhat cumbersome.

The present invention has for its object the provision of an improved arrangement of a particularly simple construction, in which re-engagement of the clutch can be effected in a simple manner, but without subjecting the balls or the parts with which they engage to substantial wear, in the event of the torque loading being heavy and the power to the driving member is not quickly cut off after clutch disengagement has occurred.

SUMMARY OF THE INVENTION

The present invention comprises an overload clutch of the kind specified, wherein the ball guiding member is mounted for rotational movement in relation to both the driving and the driven clutch members, said clutch being characterized in the provision of a free-wheel type locking device acting between the ball guiding member and one of the two clutch members, the locking device being adapted to permit, after overload has occurred but with the driving member still power rotated, of the ball guiding member free-wheeling, and thus rotating, relative to each of the two clutch members and in one direction relative to said one clutch member under the reaction of the rolling balls on the out of register ends of the guide member slots, said locking device being so arranged that when said one clutch member and the ball guiding member rotate relatively in a relative direction which is opposite to the direction of relative rotation after overload, as to lock the ball guiding member to the one clutch member in a position in which the torque transmitting openings in said one clutch member are each in register with one portion of one of said slots, and means operative after overload has occurred to apply to the balls a force acting in a direction to displace the same along their respective slots towards the out of register ends thereof.

Such free-wheel type locking device is inherently a simple form of locking device which may for instance take the form of a spring loaded pawl and ratchet device so that its provision does not add materially to the cost of the clutch.

An important feature of the overload clutch, the subject of this invention, is that when re-engagement of the clutch is required, not only is it unnecessary for the user specially to operate on the clutch by means of some suitable tool, so as temporarily to lock the ball guiding member against rotational movement relative to the one clutch member, while the two clutch members are rotated relative in a direction to re-engage the clutch, but furthermore all that the operator is required to do when re-engagement of the clutch is desired, is merely to turn in the appropriate, i.e., reverse direction, one of the two clutch members so as to rotate the two clutch members relatively in a relative direction which is opposite to the direction of relative movement which occurs between these parts following clutch disengagement; such reverse relative rotational movement having the effect of locking the ball guiding member to said one clutch member in the relative rotational position above mentioned, whereupon the operator continues reversely to rotate the one or the other clutch member until the torque transmitting openings of both clutch members are in register with one another.

Such re-setting rotational movement of either clutch member may, for example, be effected by rotating the driving clutch member backwardly, or, for example, by rotating the driven clutch member forwardly; so as in either case to produce a direction of relative rotation for re-setting which is the reverse of that obtaining when overload occurs.

Such reverse rotational movement of either of the two clutch members imparts a rolling motion to the balls which are in pressure engagement with the two resiliently urged together clutch members. This rolling movement is naturally in a circumferential direction, but the inclination of the sides of the guiding member slots to the circumferential direction and to the designed direction of clutch rotation is such that the rolling balls apply to the slot sides a reaction force causing the ball guiding member to rotate relative to the two clutch members until it is in such rotational position relative to the one clutch member as to become locked thereto.

The slot sides are further so inclined to the circumferential direction and to the designed direction of clutch rotation as during this continual reverse rotational movement, with the ball guiding member now locked to one clutch member, to apply to the rolling balls a force acting in a direction to displace them along their respective slots towards the in register portions thereof, i.e. in a direction opposite to their direction of advance after overload disengagement.

Thus, re-setting of the clutch is effected by a one stage operation involving merely reverse rotation of either of the two torque transmitting clutch members.

In particular, when one of these two clutch members is first rotated in the reverse direction, it is unnecessary specially to hold the ball guiding member against rotational movement in relation to the one clutch member to which it is lockable. Accordingly, re-engagement of the clutch can be effected in a particularly simple manner.

Since such reversely rotated clutch member according to whether it is the driving member or the driven member, will be connected to a driving or driven shaft or the equivalent, and one of these shafts or the equivalent can be turned in the direction described at a position which may be remote from the overload clutch.

Accordingly, it is unnecessary for the overload clutch to be disposed in some readily accessible position, to enable re-engagement thereof to be effected.

As by reason of a simple free-wheel type locking device being provided between the one clutch member and the ball guiding member, the latter rotates relative to both clutch members after overload, it is essential to provide means which are operative when overload has occurred, to apply to the balls a force acting to displace them towards the out of register ends of the slots. Without such means the balls will not move to their out of register position. Such means preferably comprises either the driving member or the driven member having connected thereto to rotate therewith ball displacing means in the form of a plurality of ball engaging abutments spaced circumferentially about the axis of rotation of the clutch and adapted on relative rotational movement occurring between the two clutch members each to engage with the balls and positively to displace the same in a direction along the length of their associated slot to the end thereof which is out of register with the torque transmitting openings.

BRIEF DESCRIPTION OF THE DRAWINGS

The invention is illustrated in the accompanying drawings, wherein.

DESCRIPTION OF THE PREFERRED EMBODIMENT

Figure 1:
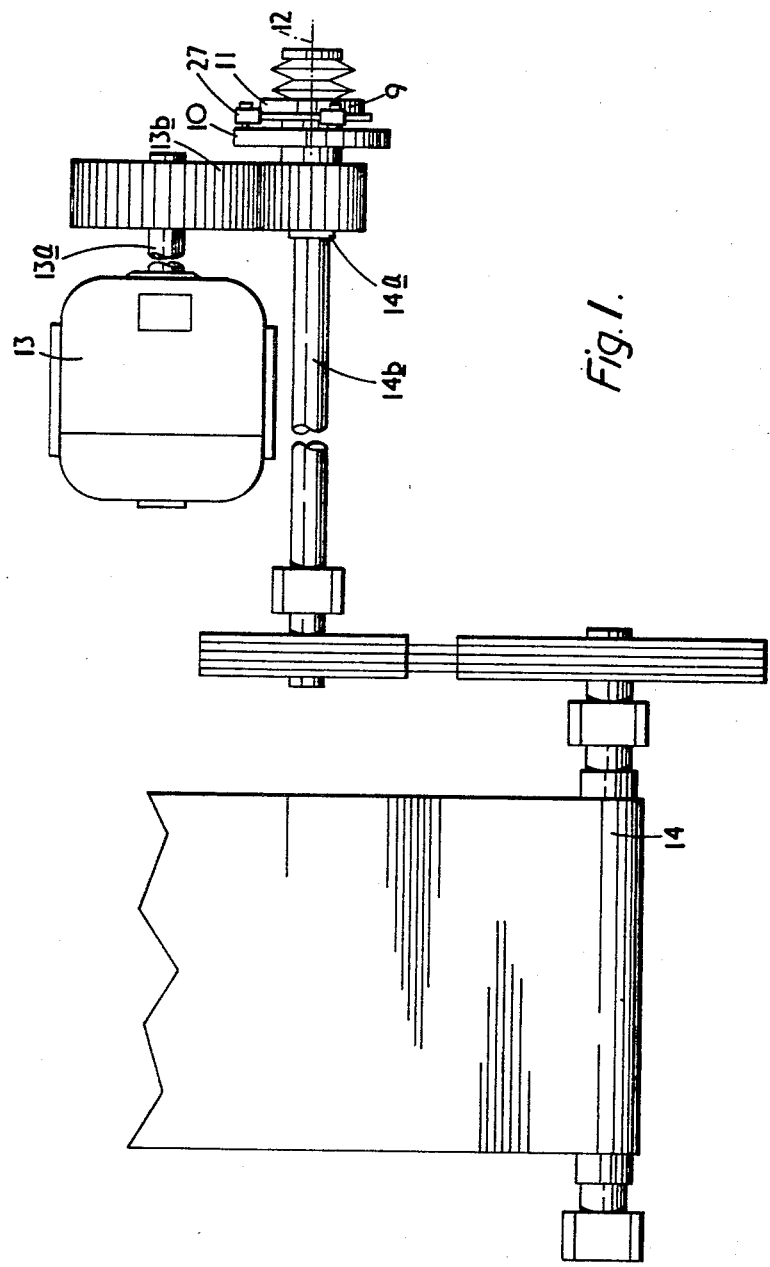
FIGURE 1 is a plan view of one form of overload clutch embodying this invention, and showing the connection of the driving and driven members to the power unit and driven part respectively.
Figure 2:
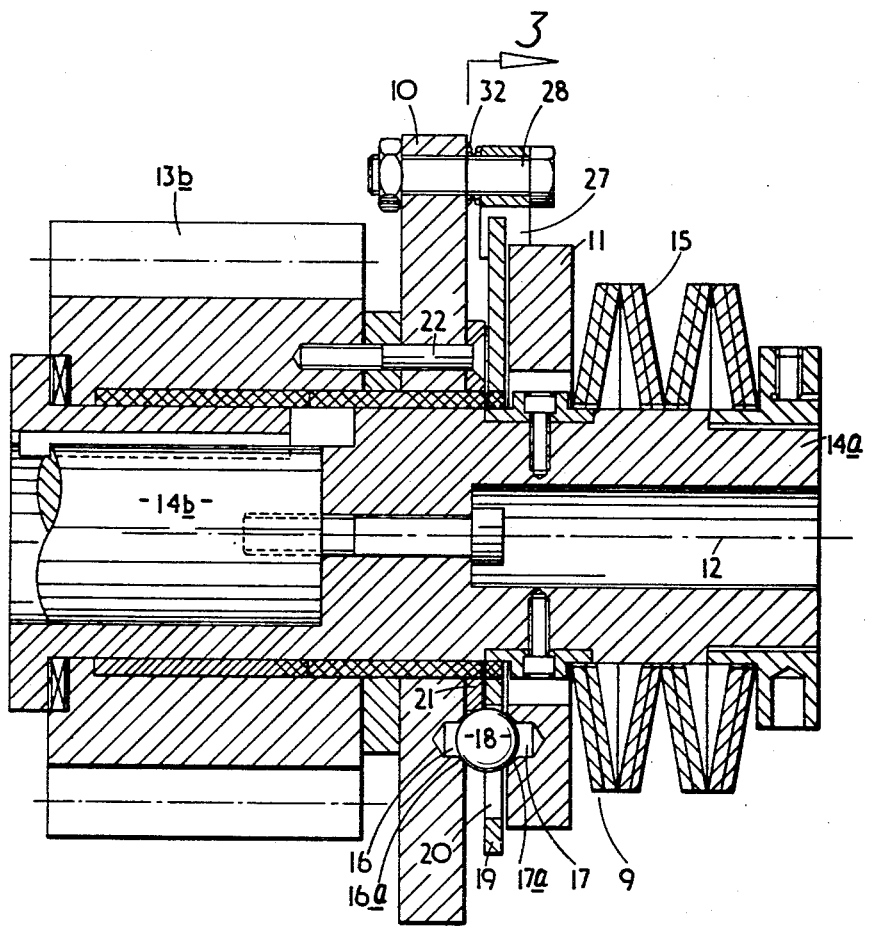
FIGURE 2 is a cross-sectional side view of the overload clutch depicted in FIGURE 1, and depicting the clutch in the engaged position.

Referring to the drawings, the overload clutch 9 there depicted comprises driving and driven torque transmitting clutch members 10, 11, each of annular disc-like configuration, and mounted for rotation about a common axis 12. The driving member 10 is connected to driving power unit 13 through driving shaft 13a and gearing 13b, and the driven member 11 is connected to driven part 14, e.g. a mechanism, namely a belt conveyor required to be power driven, the connection being through driven sleeve 14a and shaft 14b on which sleeve 14a the driving member 10 is supported for free rotation.

The driven member 11 is splined or keyed to sleeve 14a, so as to be slidable axially thereof, and is resiliently urged towards driving member 10 by loading spring 15.

The shafts 13a and 14b in FIG. 1 as drawn are broken to indicate that the overload clutch 9 may be situated remotely in relation to the power unit 13 and driven part 14.

The driving and driven clutch members 10, 11 are each provided with two concentrically arranged circumferentially disposed sets of torque transmitting openings 16, 17, which in one relative rotational position of the two clutch members are in register with one another.

Each of these openings 16, 17, is in the form of a cylindrical bore, and has a coned mouth 16a, 17a respectively, which has edge engagement with a torque transmitting ball 18 of diameter larger than the diameter larger than the diameter of the said mouths 16a, 17a. Each ball 18 serves to transmit torque from one of the openings 16 of the driving member 10 to one of the openings 17 of the driven member 11.

Disposed between the disc-like driving and driven clutch members 10, 11, is an annular disc-like ball guiding member 19, which is capable of rotating freely relative to each of the two clutch members, such member having an axial thickness less than the diameter of each of the balls 18.

Figure 3:
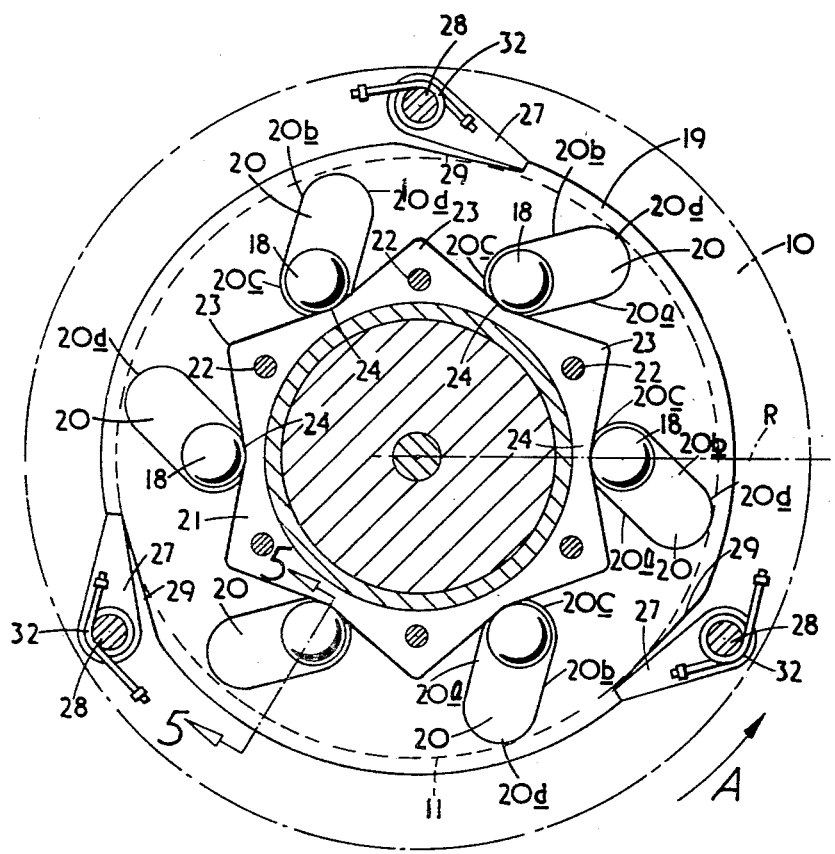
FIGURE 3 is a sectional view on the line 3—3 of FIGURE 2.

The ball guiding member 19 is formed as shown in FIGURE 3 with a set of ball guiding slots 20, the two opposite sides 20a, 20b, of which slots are of straight configuration and extend in a direction which is inclined to the circumferential direction, with the sides 20a nearest to and the sides 20b further from the clutch axis 12. Preferably the slot sides are so inclined at an angle of between about 40 to 50 degrees to a radius line R passing through the inner end portion 20c of each slot and the clutch axis 12, one of which radius lines is depicted in FIGURE 3. Such particular inclination range enables clutch disengagement and engagement to be effected particularly smoothly.

The inner end portion 20c of each slot is registrable with the torque transmitting openings 16, 17, with the other i.e. outer end 20d of each slot out of register with said openings. Each slot has a width slightly greater than the diameter of the ball 18, so that not only can each ball advance freely along its associated slot, but in addition the balls at the instant of clutch disengagement can advance initially in a circumferential direction corresponding to the then direction of relative movement between the openings 16, 17. Thus the rolling disengagement of the balls from the openings 16, 17, is facilitated.

For a reason later explained, the aforementioned inclination of each slot 20 to the radius line R is such that the outer end 20d of each slot is situated rearwardly relative to the inner end portion 20c of the slot, i.e. for the indicated direction of rotation of the clutch driving member 10 denoted by arrow A in FIG. 3, the outer end portion 20d of each slot is rearmost in relation to the inner end portion 20c.

To ensure for the reason earlier explained herein that when overload occurs the balls advance along the slots to the out of register position at the outer ends 20d thereof, the clutch driving member 10 is provided with ball displacing means in the form of a star cam 21 of annular disc-like configuration, and secured to the driving member by axially extending screws 22. This cam as illustrated has the same number of lobes 23 and dwells 24 as there are slots 20 and associated balls 18, with each dwell 24 being in radial alignment with the inner end portion 20c of each slot, and each lobe 23 extending between circumferentially adjacent slots.

Figure 4:
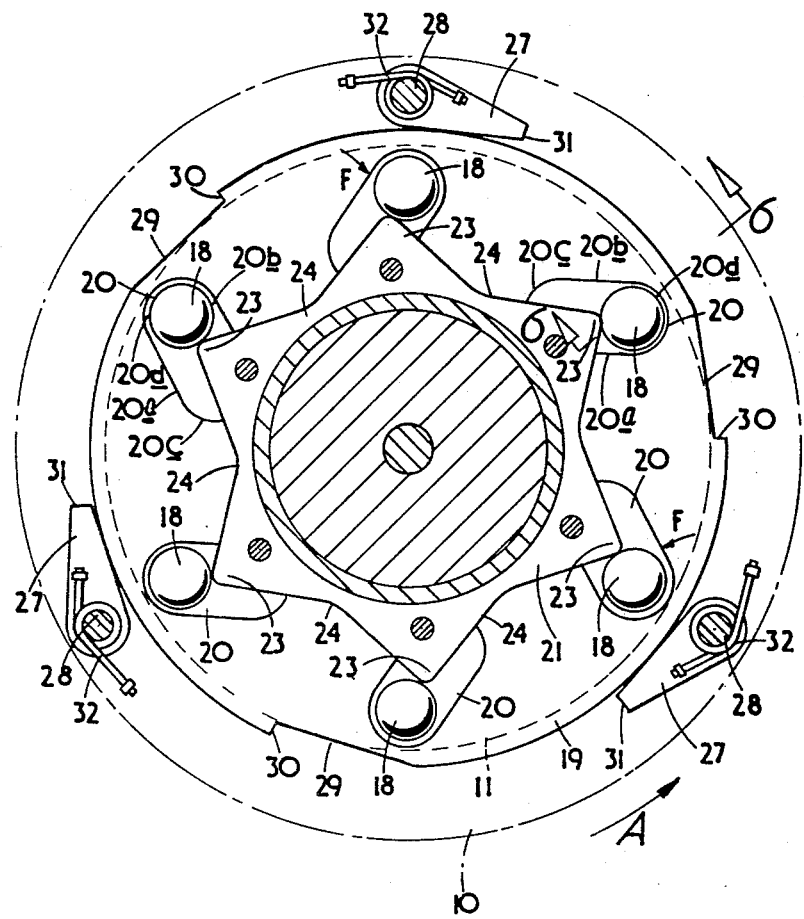
FIGURE 4 is a view similar to FIGURE 3, but depicting the position of the parts with the clutch in the disengaged position, with the driving member being still power driven.
Figure 5:
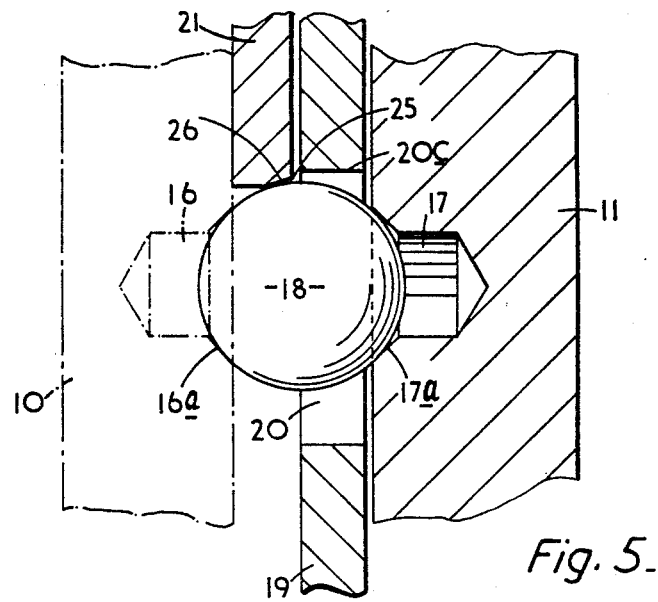
FIGURES 5 and 6 are sectional views drawn to a larger scale on the line 5—5 and 6—6 respectively of FIGURES 3 and 4.

Thus, as shown in FIGURE 4, when overload occurs and the driving member, as it is free so to do, commences to overrun the ball guiding member 19, the lobes 23 on the star cam connected to the driving member, will engage with the balls 18, so as to displace these positively to the outer end portions 20d of the slots 20 out of register with the torque transmitting openings. As shown in FIGURE 3, each cam dwell 24 is spaced radially inwardly by a small distance in relation to the inner end portion 20c of the adjacent slot 20, so as to be just out of engagement with the adjacent ball 18, when the latter is in the engaged position, so as not to interfere in any way with the above mentioned initial circumferential rolling movement of the balls at their instant of disengagement from the openings 16, 17.

Figure 6:
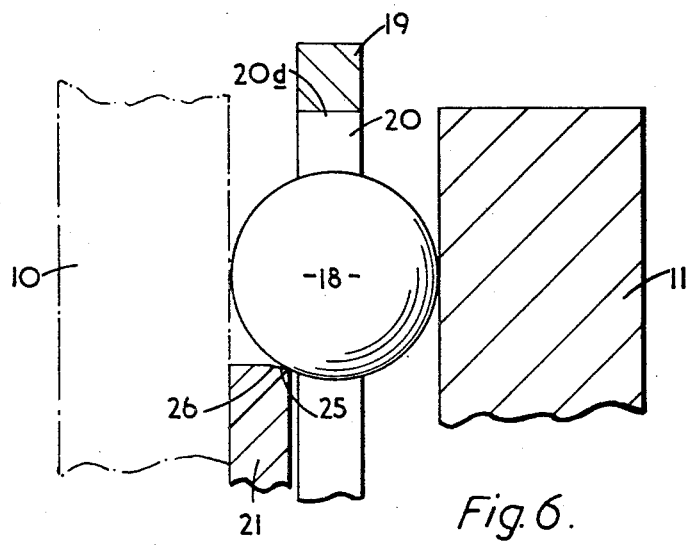

Also, as shown in FIGURE 6, the outer corner 25 of the star cam 21 is chamfered at 26 so that the balls where they are engaged by the star cam, do not engage therewith on this outer corner 25, but along the adjacent chamfered face 26, whereby undesirable wear of the cam along the outer corner is avoided.

A free-wheel type locking device is provided between the ball guiding member 19 and one of the two clutch members, namely the driving member 10, such locking device comprising a number of, namely as illustrated three, pawls 27, one end of each of which is mounted for pivotal movement on pawl pin 28 carried on driving member 10, and extending parallel to the clutch axis 12. Each pawl 27 extends from its associated pivot pin in a direction which is rearward in relation to the designed direction of rotation of the driving member 10, as denoted by arrow A in FIG. 3, and is engageable within a corresponding ratchet-like recess 29, formed in the periphery of the ball guiding member 19, such recess presenting a pawl engaging locking face 30 extending radially in relation to the clutch axis 12 and directed forwardly of the circumferential direction of rotation of driving member 10, and engageable with a rearwardly directed face 31 on the free end of each pawl 27, each pawl being provided with the usual loading spring 32 for urging it into engagement with the locking face 30 of each ratchet recess 29, as shown in FIGURE 3.

The arrangement is accordingly such that when overload has occurred and the driving member 10 commences to rotate in the direction of arrow A in FIG. 3, relative to the driven member 11, the driving member 10 is free to rotate in such direction relative to the ball guiding member 19.

Thus, when the balls 18 have been displaced by the operation of cam 21 to the outer end portions 20d of the slots 20, as shown in FIGURE 4, and are rolling in the direction of rotation of the driving member, as denoted by arrow A, but at half the angular velocity thereof as earlier mentioned, then under the reaction of the rolling balls on the outer ends 20d of the slots 20, the ball guiding member 19 will rotate in the same direction as that of driving member 10, but at half the speed corresponding to the speed of ball advancement, and the pawls 27 will ride over or free-wheel in relation to the ratchet-shaped recesses 29. Thus when the balls reach the outer ends 20d of the slots 20 they are free to continue their rolling movement relative to the stationary driven member 11 and still rotating driving member 10, with the opposed faces of which they are in pressure engagement, and wear of the balls and of the sides of the slots 20 at the outer ends thereof consequent on the continued power rotation of the driving member 10 after overload is negligible.

To effect re-engagement of the clutch after the power to the clutch driving member 10 has been cut off, one of the two clutch members is rotated in a direction such as to produce a relative rotation between the two clutch members, which is opposite to that which occurs when the driving member overruns the driven member after overload. For example, where it is convenient to re-engage the clutch by rotating the driving member 10, this would be turned in a direction opposite to the direction of rotation as denoted by arrow A in FIG. 3.

The aforementioned reverse relative rotation of the two clutch members 10, 11, and which are in pressure contact with the balls 18 causes the latter to roll at half the speed of reverse rotation of driving member 10 and in a circumferential direction opposite to the direction of arrow A. The so rolling balls by their engagement with the sides of the slots at the outer end portions 20d will necessarily apply a torque to the at present freely rotatable ball guiding member 19 to turn this in the direction of rolling of the balls and at the same speed as the balls, i.e. at half the speed of driving member 10, which accordingly turns relative to the ball guiding member in a direction opposite to arrow A until its pawls 27, are again in register with the ratchet recesses 29, with which the pawls under spring loading now re-engaged, so as again to lock the ball guiding member 19 to the clutch driving member 10 in a position, i.e. as shown in FIGURE 3, in which the inner ends 20c of the slots 20 are in register with the torque transmitting openings 16 of member 10.

As the ball guiding member 19 has been turning with the rolling balls 18 the natural direction of rolling of which is cirumferential, the balls will still be at the outer ends 20d of their respective slots. As soon as the ball guiding member 19 has been locked by the pawls 27 to the driving member 10 which is still being reversely rotated relative to the driven member 11, the inclined sides of the slots 20 will now apply a force to the balls acting in a direction along the slots. To ensure that this force acts towards the inner in register end portions 20c of the slots, the slots are inclined to the circumferential direction in such a manner that for the designed direction of rotation of the ball guiding member 19 with the clutch engaged their out of register, i.e. outer end portions 20d of the slots are rearmost relative to their inner in register ends 20c. Thus when the ball guiding member 19 now locked to clutch member 10 is turned during clutch re-engagement in a direction opposite to that of arrow A with the slot outer ends 20d now foremost relative to the slot inner ends 20c, the slot sides 20b which are further from the clutch axis 12 will now apply to the balls a force normal to such sides, as denoted by arrow F in FIG. 4, a component of which force will be directed towards the clutch axis so as to force the balls 18 along the slot 20 to the in register inner end portions 20c so that the balls now re-engage with the torque transmitting openings 16 in the driving member 10 and then with the torque transmitting openings 17 in the driven member 11 as soon as openings 16, 17 have been brought into register with one another by the continual reverse rotation of the driving member 10 so as now to effect re-engagement of the clutch.

It will be understood that the aforementioned reverse relative rotational movement of the two clutch members can be effected from a position remote in relation to the clutch by rotating at some convenient location driving shaft 13a or driven shaft 14b depicted in FIG. 1.

In the foregoing description the expressions "forwardly" and "rearwardly" have reference to the designed rotational direction during torque transmission of the part of the clutch referred to.

If desired in the above described construction, the member 11 may function as the driving member, and the member 10 may function as the driven member of the clutch. Also the pawls 27 may be provided on the ball guiding member 19 with their locating recesses 29 provided on one of the two clutch members.

We claim:

1. An overload clutch of the kind comprising resiliently urge together torque transmitting driving and driven clutch members, each having a plurality of mutually registrable ball engaging torque transmitting openings, a plurality of torque transmitting balls and a ball guiding member disposed between the two clutch members, said guiding member having a plurality of ball guiding slots, one portion of each of which slots is registrable with a pair of the mutually registrable torque transmitting openings, with one end of each slot being out of register with said openings, with the ball engaging sides of the slots intermediate the said in register portion and the said end portions extending in a direction which is so inclined to the circumferential direction, and to the designed direction of clutch rotation that when after overload re-engagement of the clutch is required, the slot sides can transmit a force to the balls to displace them along the slots to their in register portions, and the balls having a diameter greater than the axial thickness of the ball guiding member, so as to project on opopsite sides thereof into the torque transmitting openings, and wherein the ball guiding member is mounted for rotational movement in relation to both the driving and the driven clutch members, said clutch being characterized in the provision of a free-wheel type locking device acting between the ball guiding member and one of the two clutch members, the locking device being adapted to permit, after overload has occurred but with the driving member still power rotated, of the ball guiding member free-wheeling, and thus rotating, relative to each of the two clutch members and in one direction relative to said one clutch member under the reaction of the rolling balls on the out of register ends of the guide member slots, said locking device being so arranged that when said one clutch member and the ball guiding member rotate relatively in a relative direction which is opposite to the direction of relative rotation after overload, as to lock the ball guiding member to the one clutch member in a position in which the torque transmitting openings in said one clutch member are each in register with one portion of one of said slots, and means operative after overload has occurred to apply to the balls a force acting in a direction to displace the same along their respective slots toward the out of register ends thereof.

2. An overload clutch according to claim 1, characterized in that the locking device comprises the provision on one of the two members between which the device acts of a fixed locking abutment face, extending substantially radially in relation to the clutch axis, and the provision on the other of said two members of a spring loaded pawl, the free end of which is adapted to engage with said locking face.

3. An overload clutch according to claim 2, characterized in that on one of the two torque transmitting members of the clutch is mounted a plurality of spring loaded pawls, and the ball guiding member is in the form of a disc, the periphery of which is provided with a plurality of ratchet-like recesses each engageable with one of said pawls.

4. An overload clutch according to any of claims 1 to 3, characterized in that the means for displacing the balls along their respective slots towards the out of register ends of the slots comprises the provision on one of the two torque transmitting members of the clutch to rotate with such members, of a plurality of ball engaging abutments spaced circumferentially about the axis of rotation of the clutch and adapted on relative rotational movement occurring between the two clutch members each to engage with the balls and positively to displace the same in a direction along the length of their associated slot towards the end thereof which is out of register with the torque transmitting openings.

5. An overload clutch according to claim 4, characterized in that the ball displacing means comprises a cam having a plurality of circumferentially spaced lobes and dwells, each lobe extending between circumferentially adjacent torque transmitting openings of the clutch member on which the cam is provided and each of said torque transmitting openings having in radial alignment therewith one of said cam dwells.

6. An overload clutch according to claim 5, and wherein the out of register ends of the ball guiding slots are located at a greater distance from the clutch axis than the in register portions of said slots, characterized in that the cam comprises a star cam having a plurality of radially outwardly directed lobes and dwells.

7. An overload clutch according to claim 6, characterized in that the radially outwardly directed face of the star cam is chamfered at the outer corner of said face and each cam dwell is out of contact with the balls when the latter are in their torque transmitting position.

No references cited.

BENJAMIN W. WYCHE III, *Primary Examiner.*

L. J. PAYNE, *Assistant Examiner.*